US012312053B2

United States Patent
Kleinigger et al.

(10) Patent No.: US 12,312,053 B2
(45) Date of Patent: May 27, 2025

(54) TOPSIDE BUOY SYSTEM

(71) Applicant: Garmin International, Inc., Olathe, KS (US)

(72) Inventors: Michael R. Kleinigger, Fuquay Varina, NC (US); Patrick M. Danko, Overland Park, KS (US); Paul Benjamin H. Collins, Venice, CA (US); Christopher R. Koszarsky, Holly Springs, NC (US); Samantha E. Classen, Durham, NC (US); Victor N. Snesarev, Cary, NC (US); Young-hoon Kim, Raleigh, NC (US); Christopher M. Kachur, Raleigh, NC (US); James E. Corbett, Raleigh, NC (US)

(73) Assignee: Garmin International, Inc., Olathe, KS (US)

( * ) Notice: Subject to any disclaimer, the term of this patent is extended or adjusted under 35 U.S.C. 154(b) by 791 days.

(21) Appl. No.: 17/644,509

(22) Filed: Dec. 15, 2021

(65) Prior Publication Data

US 2023/0182875 A1    Jun. 15, 2023

(51) Int. Cl.
*G01S 5/18* (2006.01)
*B63B 22/00* (2006.01)
(Continued)

(52) U.S. Cl.
CPC ............. *B63C 11/26* (2013.01); *B63C 11/18* (2013.01); *G01S 15/878* (2013.01); *B63C 2011/021* (2013.01); *B63C 2011/188* (2013.01)

(58) Field of Classification Search
None
See application file for complete search history.

(56) References Cited

U.S. PATENT DOCUMENTS 8,842,498 B2    9/2014    Cahalan et al.
9,444,556 B1    9/2016    Cahalan et al.
(Continued)

FOREIGN PATENT DOCUMENTS

JP    2004340883 A    * 12/2004
KR    20120071228 A    * 7/2012

OTHER PUBLICATIONS

KR-20120071228-A English Language Translation (Year: 2012).*
(Continued)

*Primary Examiner* — Adnan Aziz
*Assistant Examiner* — Jerold B Murphy
(74) *Attorney, Agent, or Firm* — Samuel M. Korte; Max M. Ali

(57) ABSTRACT

A topside buoy system is disclosed for relaying a status of a diver between a monitoring station and a diver's wearable device and scuba tank pod. The communication may be carried by sonar signals underwater and may be transmitted by short-range communication methods through air. An application on the command station may display diver status information and may receive and transmit messages between the command station and the wearable device of the diver via the topside buoy. The diver location data may be determined relative to the topside buoy by determining a time delay of the sonar signal between the wearable device and the topside buoy, by a plurality of transducers configured to detect an angle from which the sonar signal originated, and a depth of the diver included in the sonar signal.

12 Claims, 6 Drawing Sheets

(51) Int. Cl.
  *B63C 11/02*   (2006.01)
  *B63C 11/18*   (2006.01)
  *B63C 11/26*   (2006.01)
  *G01S 15/87*   (2006.01)

(56) References Cited

U.S. PATENT DOCUMENTS

| | | | |
|---|---|---|---|
| 9,503,202 | B2 | 11/2016 | Cahalan et al. |
| 9,668,041 | B2 | 5/2017 | Vavrus et al. |
| 10,179,635 | B2 * | 1/2019 | Erikson ............... H04B 11/00 |
| 10,611,445 | B1 * | 4/2020 | Earl .................... B63C 11/02 |
| 11,374,658 | B2 | 6/2022 | Melodia et al. |
| 2015/0046014 | A1 * | 2/2015 | Hesse .................. B63G 8/001 |
| | | | 701/23 |
| 2019/0185122 | A1 | 6/2019 | Hamme et al. |
| 2022/0038190 | A1 | 2/2022 | Jackson et al. |

OTHER PUBLICATIONS

Azimuth Incorporated (Diver, 6, System Overview & Technical Capabilities) (Year: 2021).*
JP-2004340883-A English Language Translation (Year: 2004).*
Azimuth Incorporated, Diver 6 System Overview & Technical Capabilities, published prior to Dec. 15, 2021.
EdgeTech Broadband Acoustic Tracking System (BATS), published prior to Dec. 15, 2021.
Printout from https://techlinkcenter.org/technologies/networked-buoy-connects-with-a-diver-s-mobile-device-while-underwater/4285413d-e37d-4ebf-b763-ce4872ccff40 published prior to Dec. 15, 2021.
Printout from https://www.seatrac.com/the-seatrac-system/how-it-works, published prior to Dec. 15, 2021.

* cited by examiner

TOPSIDE BUOY SYSTEM

BACKGROUND

Some wearable devices for monitoring underwater divers obtain information regarding the status of the divers and their dive equipment. The information typically is stored on a device worn by a diver which may provide alerts to the diver as to the status of the breathable gas and the time that the diver has been underwater. Furthermore, the information may provide a depth of the diver. Some topside systems allow the diver wearable device to communicate with the surface via a cable or tether.

SUMMARY

Embodiments of the present disclosure provide systems for monitoring the status of an underwater diver and relaying the status information to remote monitoring stations via a topside buoy. Various embodiments provide a topside system for monitoring a status of a diver. The topside system comprises one or more transducers for receiving a first sonar signal from a wearable device of the diver, wherein the first sonar signal comprises dive data, wherein the dive data is indicative of a depth of the diver, and a transceiver configured to transmit to and receive from a water surface topside monitoring station, wherein the transceiver receives instructions from the topside monitoring station, and wherein the one or more transducers transmit a second sonar signal indicative of the instructions to the wearable device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
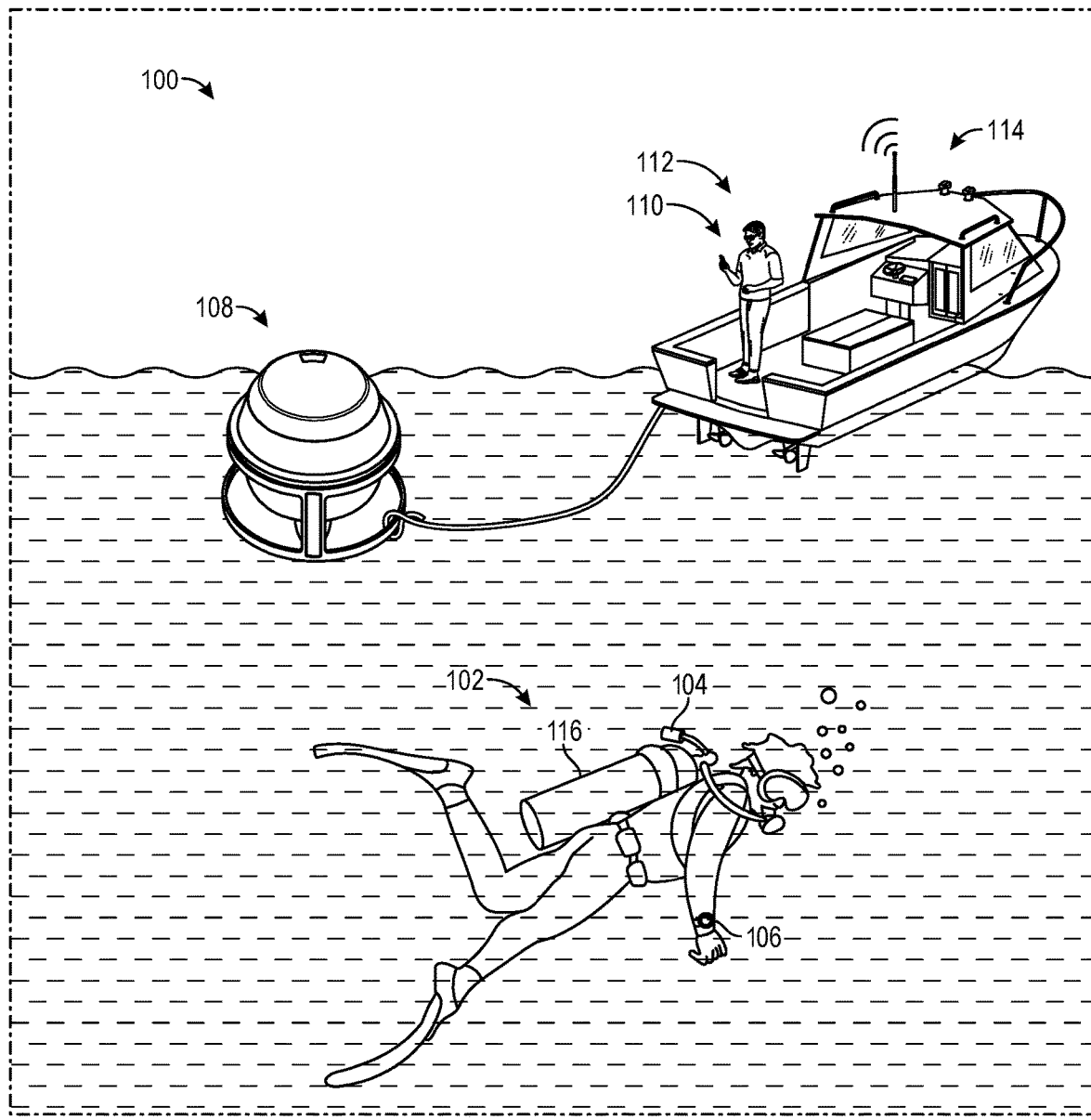
FIG. 1 depicts an exemplary environment for employing a topside system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

In general, embodiments of the present disclosure are directed to a system for monitoring the status of a diver underwater. The diver may wear a self-contained underwater breathing apparatus (scuba). In some embodiments, the diver status monitoring system may comprise a scuba tank pod for detecting gas pressure in the scuba tank, a wearable device worn on the diver in communication with the scuba tank pod and that provides information to and receives input from the diver, and a topside buoy for communicating with the scuba tank pod, the wearable device, and a remote and communication station. In some embodiments, the location and the status of the diver may be determined and transmitted by the topside buoy. The topside buoy may receive and store any communications and relay the communications to the remote monitoring station. The diver may interface with the wearable device to send communications to the topside buoy and on to the remote monitoring station. The remote monitoring station may map the location of the diver-to-diver environment data comprising any targets for the diver and obstacles that may be present in the dive environment. Furthermore, transmissions from the remote monitoring station may be received at the topside buoy and relayed to the wearable device providing instructions to the diver. In some embodiments, the transmissions from the remote monitoring station may be in the form of text messages.

FIG. 1 depicts an exemplary dive scenario 100 where diver 102 is underwater with scuba tank pod 104 and wearable device 106 in communication with topside buoy 108 which is also in communication with topside monitoring station 110 held by topside monitoring station user 112 on boat 114. In some embodiments, topside monitoring station 110 may be a mobile device (as shown) or may be any computing device as described in embodiments below. In some embodiments, scuba tank pod 104 may be in fluid communication with the gas of scuba tank 116 and measure a pressure of the gas in scuba tank 116. In some embodiments, scuba tank pod 104 may also detect water pressure at depth and store the water pressure data. Scuba tank pod 104 may store the gas pressure and the water pressure and send a signal indicative of the gas pressure and the water pressure to wearable device 106 or to the Topside Buoy 108 by sonar. In some embodiments, wearable device 106 may receive the sonar signal and process the signal to notify diver 102 of the remaining gas and depth data. Diver 102 may also be notified of a time remaining before the gas runs out. Any alerts may be provided to any senses of diver 102 to notify diver 102 of any immediate danger based on the received data. Exemplary dive scenario 100 is discussed in more detail below.

Figure 2:
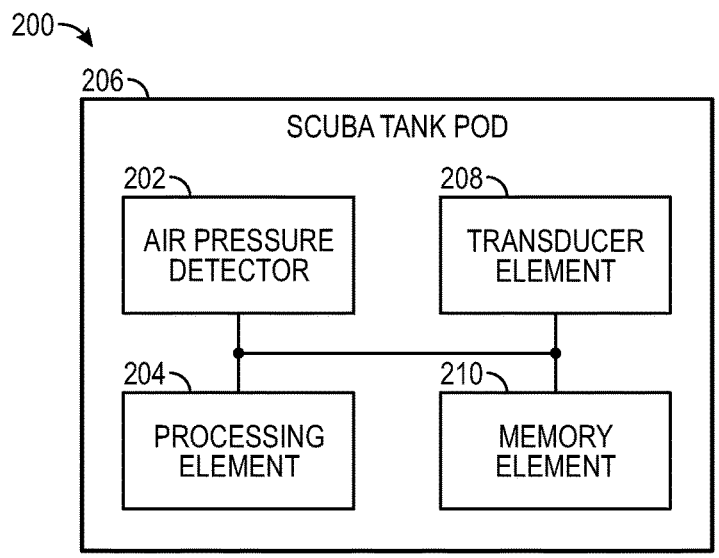
FIG. 2 depicts exemplary hardware of a scuba tank pod.

FIG. 2 depicts exemplary scuba tank pod hardware components 200 of scuba tank pod 104. In some embodiments, scuba tank pod 104 may be connected to a pressure port of scuba tank 116 and may detect the gas pressure in scuba tank 116. In some embodiments, scuba tank pod 104 comprises pod pressure detector 202, pod processor 204, pod transducer 208, and pod memory 210. Pod pressure detector 202 may be coupled to scuba tank 116 and detect the gas pressure in scuba tank 116. Pod pressure detector 202 may be connected to a pressure port, a respirator line, or the respirator. The gas pressure in scuba tank 116 may provide valuable information such as, how much breathable gas remains and, thus, how long diver 102 may remain underwater. Pod pressure detector 202 may detect the gas pressure continuously or intermittently. Pod pressure detector 202 may transmit a signal indicative of the gas pressure to pod processor 204 and pod memory 210.

In some embodiments, scuba tank pod 104 may also comprise a water pressure sensor for detecting the water pressure at scuba tank 116. The water pressure may be indicative of a depth of diver 102. As such, the depth of diver 102 may be known based on the water pressure detected at scuba tank pod 104. The detected water pressure and/or depth data may be transmitted to wearable device 106 by sonar signal generated by pod transducer 208.

In some embodiments, pod memory 210 may be a standalone memory or included with pod processor 204. In general, all computing system described herein may store computer-readable media storing computer-executable instructions executable by any processor described herein. Computer-readable media may include both volatile and nonvolatile media, removable and nonremovable media, and media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations. Computing devices may be included on scuba tank pod 104, wearable device 106, topside buoy 108, and topside monitoring station 110.

Generally, in embodiments described herein, any transducer described herein may convert electrical energy to mechanical energy and vice versa. Transducers may receive sound, or sonar, signals through a medium such as, in this case, water and convert the sonar signal to an electrical signal. Furthermore, the transducers described herein may receive electrical signals and generate mechanical signals such as sonar signals. For example, pod transducer 208 may receive an electrical signal indicative of the gas pressure from any component of scuba tank pod 104 generated at pod pressure detector 202 and send a sonar signal indicative of the gas pressure to wearable device 106. The signal transmitted from scuba tank pod 104 to wearable device 106 may be sonar waves such as, for example, pressure, acoustical, mechanical, and/or vibrational waves that are indicative of the gas pressure in scuba tank 116. In some embodiments, wearable device 106 and topside buoy 108 also comprise transducers.

Figure 3:
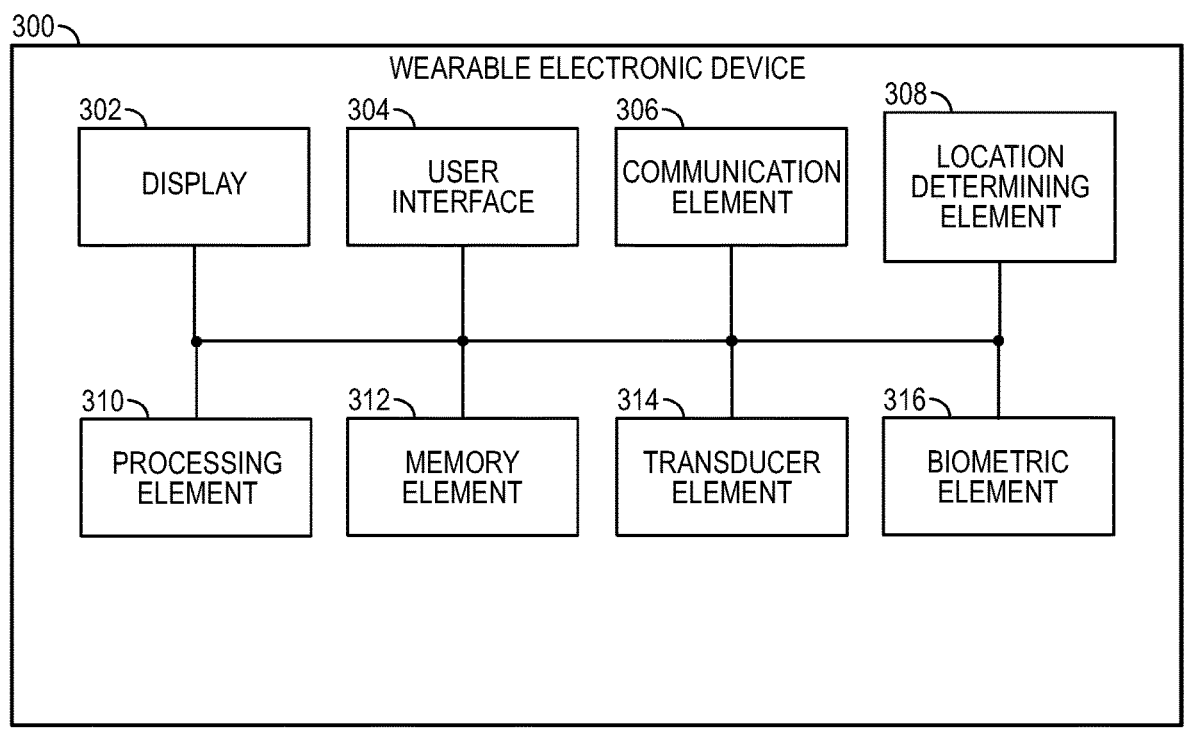
FIG. 3 depicts exemplary hardware of a wearable electronic device.

FIG. 3 depicts wearable device hardware components 300 of wearable device 106. In some embodiments, wearable device 106 may comprise wearable device display 302, wearable device user interface 304, wearable device transceiver 306, location determining element 308, wearable device processor 310, wearable device memory 312, wearable device transducer 314 and biometric element 316. Wearable device 106 may comprise the computing components as described above for storing non-transitory computer-readable media and executing computer-executable instructions. Wearable device display 302 may comprise any typical display for mobile and small electronic devices. In some embodiments, wearable device display may be a touchscreen configured to receive input by diver 102. Furthermore, wearable device 106 may comprise buttons, switches, knobs, and any other input components for receiving input from diver 102 and generating electrical signals that may be interpreted by wearable device processor 310.

Figure 5:
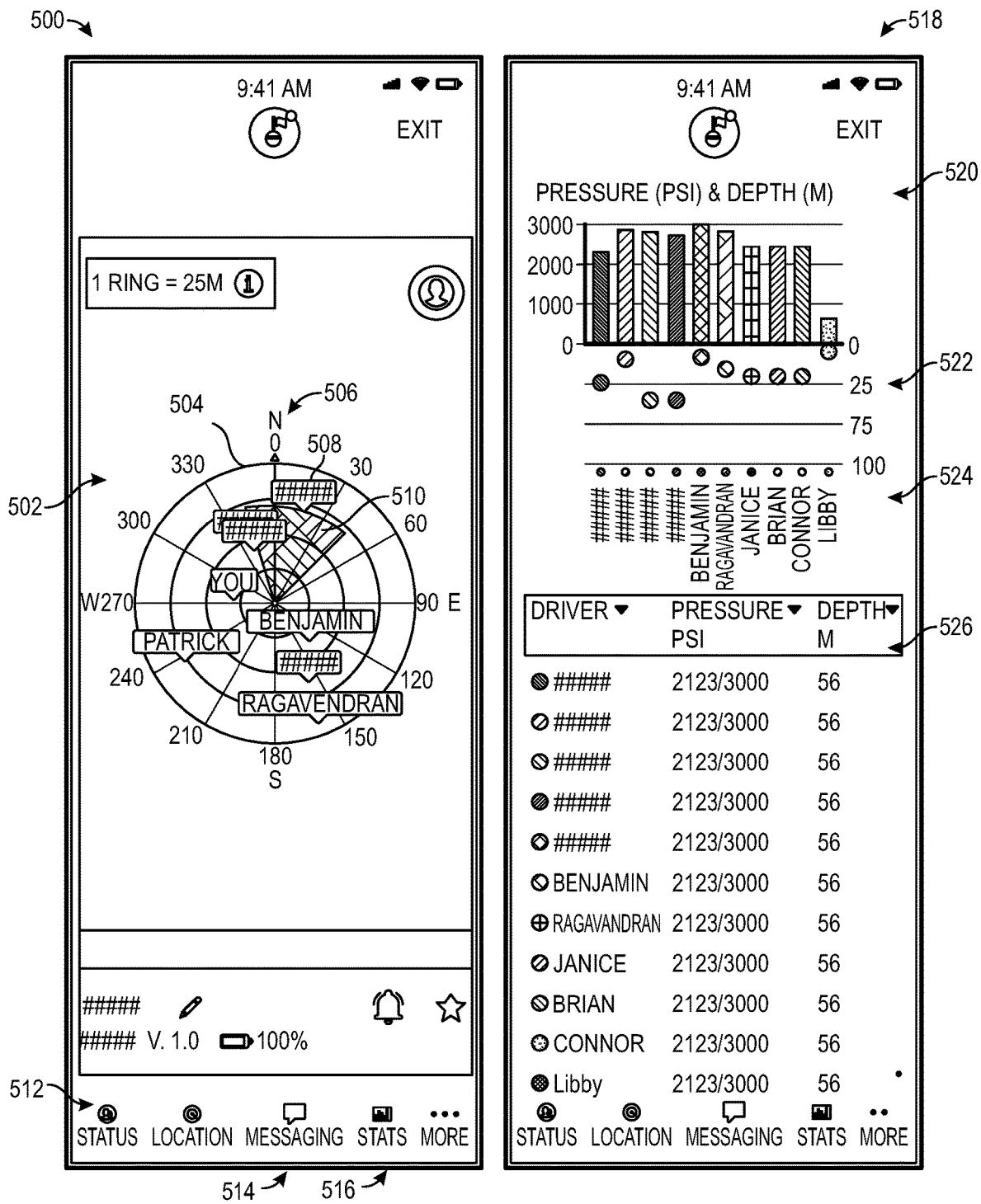
FIG. 5 depicts an exemplary dive status interface.
Figure 6:
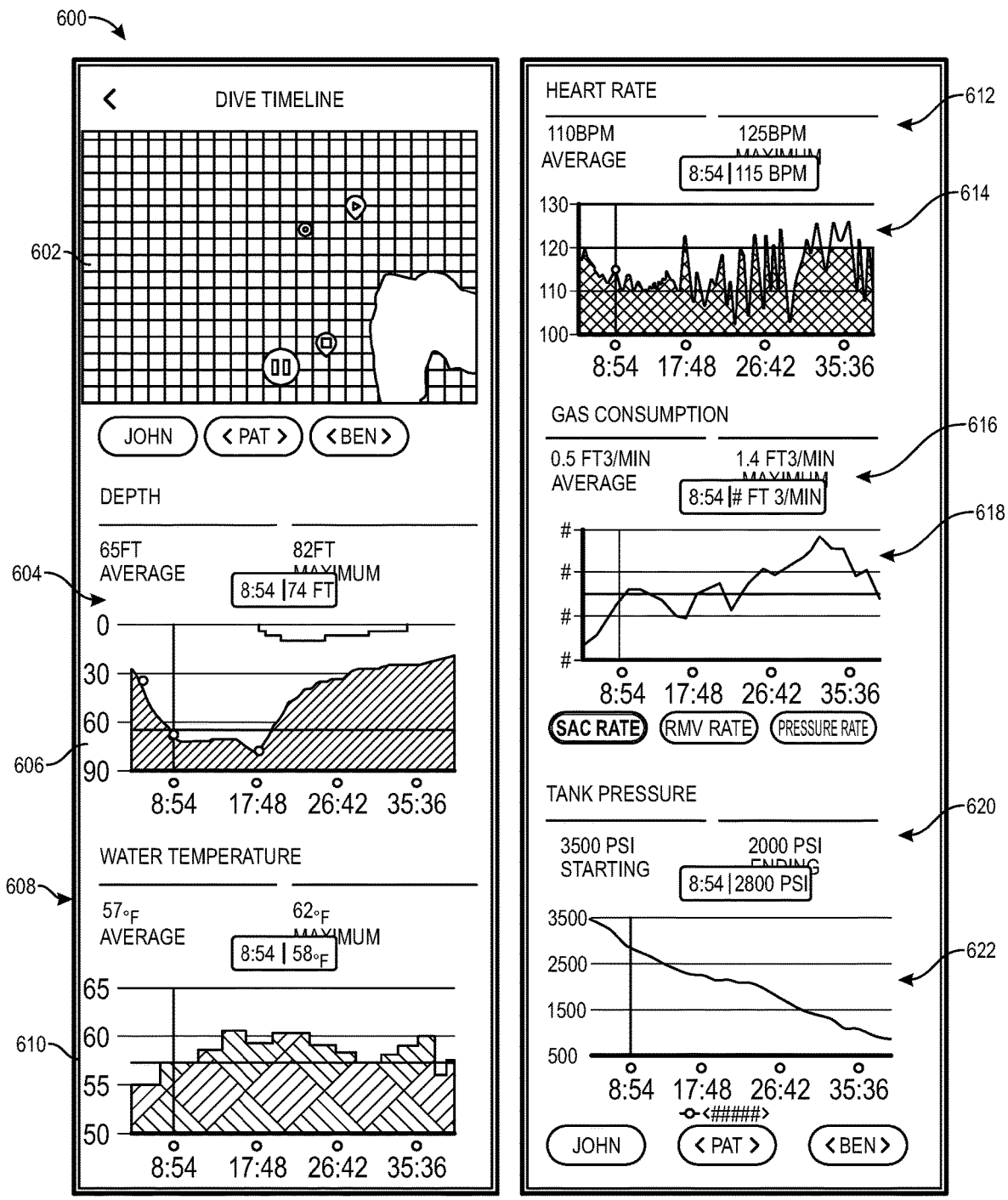
FIG. 6 depicts an exemplary dive analytics interface.

Wearable device 106 may further comprise wearable device user interface 304. Wearable device user interface 304 may provide for interaction with diver 102 by the above-described methods. Wearable device user interface 304 may provide instructions to diver 102 in the form of text message, maps, arrows, directions, and any other method. In some embodiments, wearable device user interface 304 may provide dive data and analytics as shown in FIGS. 5 and 6 and described in detail below.

In some embodiments, wearable device 106 may comprise wearable device transceiver 306. Wearable device transceiver 306 may compare any short-range communication such as, WiFi, BLUETOOTH, radio frequency (RF) communication, or the like. In some embodiments, the communication may be 4G, 5G, or satellite communication. Wearable device transceiver 306 may communicate with any status monitoring system components described herein.

In some embodiments, wearable device 106 comprises location determining element 308. Location determining element 308 may be any sensor and/or instructions for determining the location of wearable device 106. Location determining element 308 may process signals from satellites, beacons, and nearby reference stations, to determine a location of wearable device 106. Location determining element may be any global positioning system GPS or a transducer for communicating underwater as described above. Location determining element may determine the geographic location of wearable device 106 or a relative location based on communications from beacons and/or nearby reference stations. A geographic location may be determined based on the geographic location of the beacons and/or nearby reference stations. In some embodiments, the nearby reference stations may be topside monitoring station 110. Location determining element 308 may additionally or alternatively include a 3D digital magnetic compass and/or other internal navigational components for determining orientation and position.

In some embodiments, wearable device 106 may comprise biometric element 316. Biometric element 316 may comprise sensors for detecting any biometrics of diver 102 such as, for example, respiration, pulse oxygen, heart rate, core temperature, and the like. Biometric element 316 may detect and track the biometric data to monitor the status of diver 102. The biometric data may be transmitted along with data collected by scuba tank pod 104 and any other data collected by wearable device 106 as dive data to topside buoy 108. The dive data may comprise any gas pressure, water pressure, depth, biometric, and location data and may be transmitted by wearable device transducer 314 to topside buoy 108.

In some embodiments, a water pressure detector may be used for determining depth. In some embodiments, the water pressure detector may be disposed on scuba tank pod 104 or wearable device 106. The water pressure detector may measure the pressure of the water at depth and send a signal indicative of the pressure and, thus, the depth of diver 102. The signal may be included in the sonar signal and may be sent to the wearable device 106 and topside buoy 108. Furthermore, wearable device 106 may transmit a similar signal to topside buoy 108 indicative of the water pressure and the depth of diver 102. Topside buoy 108 may determine the depth from the received pressure or may receive the depth information directly from wearable device 106. Topside buoy 108 may then relay any data including the pressure and depth data to topside monitoring station 110. Wearable device 106 and scuba tank pod 104 are described in detail in U.S. Pat. No. 10,611,445, filed Sep. 19, 2018, and entitled "WEARABLE ELECTRONIC DEVICE FOR DETECTING DIVER RESPIRATION," which is incorporated by reference herein in its entirety.

Figure 4A:
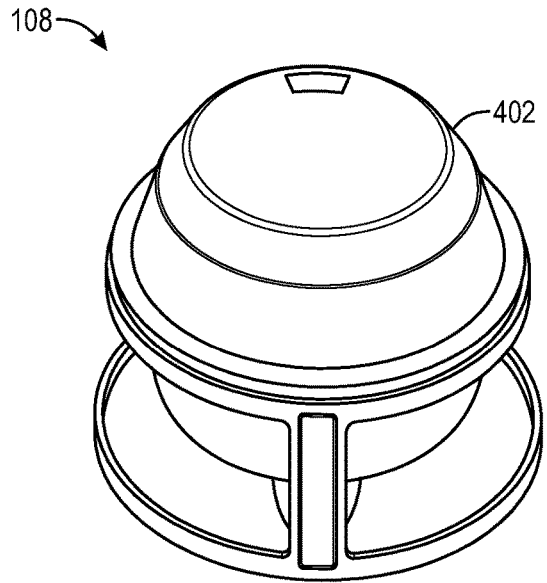
FIG. 4A depicts an exemplary topside buoy.

FIG. 4A depicts topside buoy 108. In some embodiments, topside buoy 108 comprises housing 402. Housing 402 may provide a durable shell that is also waterproof or water resistant. Housing may be made of plastic or a composite material that allows for any signal described herein to pass unimpeded. Housing 402 may also be lightweight such that topside buoy 108 may be transported by hand. Topside buoy 108 may also be buoyant such that topside buoy 108 floats and keeps water away from electronic components.

Figure 4B:
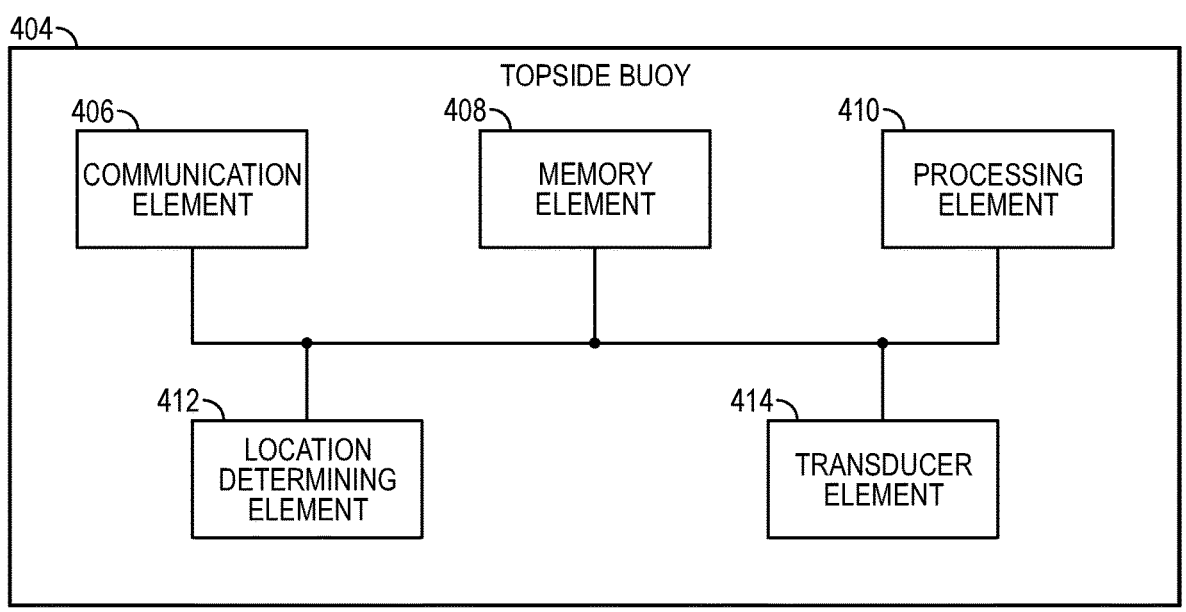
FIG. 4B depicts exemplary hardware of the topside buoy of FIG. 4A.

In some embodiments, topside buoy 108 may comprise topside buoy hardware components 404 depicted in FIG. 4B. Topside buoy hardware components 404 may include buoy transceiver 406, buoy memory element 408, buoy processing element 410, buoy location determining element 412, buoy transducer element 414, and any general hardware components that may be necessary in embodiments described herein. In some embodiments, topside buoy 108 may float above diver 102 and may be configured to receive data from diver 102 and topside monitoring station 110. Furthermore, topside buoy 108 may transmit data to diver 102 and topside monitoring station 110. In some embodiments, any data obtained and collected at topside buoy 108, may be processed and stored at topside buoy 108, and processed at topside buoy 108 before transmitting to diver 102 and topside monitoring station 110. In some embodiments, the combination of topside buoy 108 and topside monitoring station 110 are generally referenced as topside monitoring system.

FIG. 4B depicts the exemplary hardware components for embodiments described herein. In some embodiments, topside buoy 108 comprises buoy transducer element 414. In some embodiments, buoy transducer element 414 may be the same or similar to the transducers described above. Buoy transducer element 414 may receive sonar signals from scuba tank pod 104 and wearable device 106 and generate electrical signals based on the sonar signal. The electrical signals may be indicative of the data sent from scuba tank pod 104 and wearable device 106. The electrical signals may be processed by buoy processing element 410 and stored and transmitted to topside monitoring station 110, wearable device 106, and scuba tank pod 104.

In some embodiments, topside buoy 108 comprises buoy memory element 408. Buoy memory element 408 may function to store any data obtained by and sensors and processed by buoy processing element 410. Furthermore, as described above, buoy memory element 408 may comprise computer-readable media storing computer-executable instructions that, when executed by buoy processing element 410, perform the processes described herein.

In some embodiments, topside buoy 108 comprises buoy transceiver 406. Buoy transceiver 406 may comprise a transmitter and receiver for communicating by transmitting wireless signals to the topside monitoring station 110. The wireless signals may be transmitted by radio frequency at any frequency or by any other long or short-range communication signal. In some embodiments, topside buoy 108 and topside monitoring station 110 may be in communication on a local-area network. In some embodiments, buoy transceiver 406 may communicate on a local-area network such as WiFi and topside monitoring station 110 may be any computer, mobile device, tablet, or any other computing element that may execute an application as described in reference to FIG. 5 and FIG. 6 below. As described in detail below, data, including messages, may be transmitted between wearable device 106 and topside monitoring station 110 via topside buoy 108. Confirmation of receipt of the transferred data may also be transmitted upon receipt of the transferred data by wearable device 106, topside buoy 108, and topside monitoring station 110.

In some embodiments, buoy transceiver 406 may be any element configured for communication between wearable device 106, topside monitoring station 110, satellites, remote communication stations such as cellular towers and the like. For example, buoy location determining element 412 may communicate by 3G, 4G, 5G, long term evolution (LTE), general packet radio service (GPRS) for communication directly to a cloud storage or satellite data link. In some embodiments, buoy transceiver 406 may communicated with emergency communication system and local emergency beacons for SOS satellite emergency response.

In some embodiments, a distance between diver 102 and topside buoy 108 may be determined. In a first exemplary scenario, buoy transducer element 414 may include a plurality of transducers. The plurality of transducers may be arranged in a triangular formation such as, for example, an equilateral or isosceles triangle. As such, the sonar signal transmitted from wearable device 106 or Scuba Tank Pod 104 of diver 102 may arrive at each transducer of the plurality of transducers at a different time. The time of arrival of the signal at each transducer may be based on the transducer that is nearest to the signal origin relative to the transducer that is farthest from the signal origin. As such, the time difference between the time of arrival of the sonar signal at the three transducers, based on a constant speed of the sonar signal through water, may be used to determine the angle from which the signal came. In general, the difference between the time of arrival at each transducer may be in the range of 60-70 microseconds based on a distance (e.g., 4 inches) between each transducer. The angle from which the signal originated along with the depth of the diver, may provide the relative location of diver 102 to topside buoy 108. Because topside buoy 108 location is known by buoy location determining element 412, the location of diver 102 is also known. Combining phase differences between the transducer signals may additionally or alternatively be utilized to determine direction and/or position.

In some embodiments, the distance between diver 102 and topside buoy 108 may be determined by measuring the time for the sonar signal to cross from diver 102 to topside buoy 108. In some embodiments, the sonar signal may transmit time along with the dive data. In some embodiments, a first packet of the sonar signal may be a pilot pulse comprising information about the sonar signal. The pilot pulse may comprise information indicative of the time that the signal was transmitted from wearable device 106 and is synchronized with other wearable device and scuba tank pods on other divers and topside buoy 108. The time delay between transmission and receipt may be used to determine the distance travelled. Furthermore, a periodic transmission at an expected time may be programmed such that the expected time of arrival and the actual time of arrival of the sonar signal may be indicative of the travel time of the sonar signal through water. The travel time, based on the speed of the sonar signal in water, may be determined, and, as such, the distance between diver 102 and topside buoy 108 may be determined. Any affects based on water salinity and temperature may be taken into account for the speed of the sonar signal in water. As such, the location of diver 102 relative to topside buoy 108 may be determined using the measured water pressure (e.g., depth of the diver), angle from which the sonar signal originated, and the time of travel for the sonar signal. The method of determining a location of diver 102 relative to topside buoy 108 described herein is provided as an example, and any known or subsequently discovered method may be used without departing from the present teachings.

In some embodiments, the location of diver 102 relative to topside buoy 108 may be used to determine the geographic location of diver 102. The location of topside buoy 108 may be known by location determining element 412. Location determining element 412 may be a GPS receiver or short- or long-range communication device for determining geographic location or location relative to another known object. Location determining element 412 may communicate as described in examples above such as WiFi, BLUETOOTH, RF, and any other method. The location may be determined by on-board programing using the location of GPS satellites, digital compass information, attitude information, internal navigation information, beacons, cellular towers, and local and remote reference stations such as topside monitoring station 110. By combining the three-dimensional location of topside buoy 108 with the three-dimensional location of the diver 102 relative to topside buoy 108, the geographic location of diver 102 may be determined.

In some embodiments, the location of diver 102 may be integrated with map data of the diving environment or diving area. The map data may be any open-source or privately owned data set indicative of underwater terrain, pipelines, shipwrecks, and the like. The location of diver 102 may be compared to the underwater terrain as well as man-made objects such that a location of diver 102 relative to obstacles and/or targets may be determined. For example, diver 102 may dive near a restricted area that has underwater obstacles such as, for example, turbines for generating electricity using underwater currents. The geographic location of diver 102 may be determined as described above. Topside monitoring station 110 may determine the geographic location of diver 102 relative to the geographic location of the restricted area and transmit a warning based on proximity of diver 102 to the restricted area. In some embodiments, a threshold distance or a geofence is defined surrounding the restricted area. Diver 102 may be alerted based on the geofenced area.

In some embodiments, diver 102 may receive instructions on how to avoid the restricted area. The instructions may be provided in cardinal directions or a call to surface may be transmitted to wearable device 106 of diver 102. The instructions may direct diver 102 to avoid the obstacles. The instructions may be displayed by wearable device display 302 of wearable device 106. In some embodiments, the map data may be stored at topside buoy 108 and the signal to direct diver 102 to avoid the obstacles may be generated and sent by topside buoy 108 without topside monitoring station 110.

In an alternative exemplary scenario, diver 102 may dive near a target object such as a pipeline that is need of repair and diver 102 may be an underwater welder that is hired to repair the pipeline. As such, the instructions may be sent from topside monitoring station 110 to diver 102 via topside buoy 108 or, in some embodiments, the signal may be sent directly from topside buoy 108 to direct diver 102 to the target location by wearable device 106. Similarly, diver 102 may be an underwater explorer and topside buoy 108 may be placed at a location that an object was detected on the sea floor by a sonar device aboard boat 114. Diver 102 may be directed to the location of the sonar hit. Similarly, the sonar hit may be a shipwreck, and diver 102 may be directed to the previously known location of the shipwreck. Any exemplary scenario may be imaged for diver 102 to either avoid a particular location of be directed to a particular location based on the objective of the dive.

In some embodiments, if diver 102 encounters trouble diver 102 may signal an emergency alert by wearable device 106. Diver 102 may press any button, knob, electronic button provided on wearable device user interface 304 or by any other method. In some embodiments, the emergency alert may be triggered automatically by a triggering event. The triggering event may be, for example, proximity to obstacles, pressure measurement indicating depth below a threshold value, scuba tank gas below a threshold value measure by time or gas pressure sensor, lack of movement by diver 102 indicating that diver 102 may be stuck, slow response time from diver 102, loss of communication with diver 102, ascending too fast, and any other event that may be indicative of diver 102 being in an emergency situation. Topside buoy 108 may transmit an SOS to topside monitoring station 110, beacon, or SOS emergency by satellite SOS or GEOS services.

In some embodiments, a plurality of divers may dive with topside buoy 108 in communication with all divers. In some embodiments, a plurality of topside buoys may be used. FIG. 5 depicts an exemplary scenario where dive interface 500 may be presented at topside monitoring station 110 in communication with a plurality of divers in the water by topside buoy 108. Topside monitoring station 110, in this exemplary scenario, may be a mobile device and diver interface may be displayed by a mobile application stored on the mobile application or accessible as a cloud application. Topside monitoring station 110 may be any computing device and any online website or local- or cloud-based application may be accessed to display dive interface 500. In some embodiments, dive interface 500 may be stored on wearable device 106 and may be accessible to diver 102. The data collected by the sensors associated with the scuba tank pod 104, wearable device 106, and topside buoy 108 may be transmitted to the topside monitoring station 110. Topside buoy 108 may relay data and messages to and from the topside monitoring station 110 by a local network or short-range communication as described above. In some embodiments, dive interface 500 may be presented in real time at topside monitoring station 110 and/or on wearable device 106. Furthermore, the dive data may be stored and dive interface 500 and may be presented after the dive for review.

As depicted, location interface 502 is depicted on dive interface 500. In some embodiments, location interface 502 depicts a radar screen showing cardinal directions 506, rings 504, diver indicia 508, and location accuracy wedge 510. In some embodiments, location interface 502 presents the radar screen showing relative position of each of the divers in the water relative to topside buoy 108 as well as an estimated accuracy of the diver locations. A diver indicium may be displayed for each diver that is communicatively connected to topside buoy 108. Diver indicia 508 may provide the name or an identification number of the diver associated with diver indicia 508. Each diver may be communicatively connected to topside buoy 108 by wearable devices and/or scuba tank pods as described in embodiments above. Each device may have an associated identification that may be associated with the diver wearing the device. The identification number may be included in the sonar signal transmitted to topside buoy 108. As such, each diver is tracked and in communication with topside buoy 108 and, in some embodiments, topside monitoring station 110 and the other divers. Therefore, any of the above-described embodiments associated with a single diver may be similarly applied to a plurality of divers.

As shown, location accuracy wedge 510 may indicate an accuracy of the location determined for diver 102. For example, diver 102 may view the radar screen on wearable device 106 and select the indicia that displays "YOU." When selected, diver data associated with diver 102 may be displayed as well as location accuracy wedge 510. Location accuracy wedge may have a width that provides a possible area when diver 102 may be located. Furthermore, location accuracy wedge 510 may be color coded to show a quick reference as to the accuracy. Location accuracy wedge 510 may be narrow and green showing a high location accuracy. Similarly, location accuracy wedge 510 may be medium wedge and yellow or wide and red. Any possibilities of width and color may be imagined as well as any shape. For example, circles or squares may be used at detected locations or different shapes may indicate different divers.

In some embodiments, menu 512 may provide options for topside monitoring station user 112 such as messaging button 514, stats button 516, and more. In some embodiments, topside monitoring station user 112 may communicate with diver 102 via topside buoy 108 via a messaging interface provided by messaging button 514. The messaging interface may be any standard messaging interface. Topside monitoring station user 112 may type a text message that may be transmitted to topside buoy 108 over the local network or short- or long-range communication described herein. Topside buoy 108 may then transmit the message to wearable device 106 by the above-described sonar communication. In some embodiments, dive interface 500 may be provided on any mobile device and may integrate with any direct or text messaging system of the mobile device (e.g., imessage, SMS, and direct message). Furthermore, the dive interface 500 may be accessed on any tablet, laptop, desktop, or any other computing device and may similarly integrate with the host system messaging applications. As such, any computing device may be used by topside monitoring station user 112 to communicate diver status information to wearable device 106 of diver 102 by message including the location of diver 102 and instruction to diver 102.

When stats button 516 on menu 512 is selected, stats interface 518 may be presented. Stats interface 518 may provide visualizations of the dive data including diver status data. The exemplary pressure and depth data for each diver may be displayed in graph 520. Graph 520 depicts a bar graph for visualizing the pressure and a lower table 522 depicting depth of each diver. Each diver name may be presented on name table 524 for associating each diver with the corresponding data. Data table 526 may also displayed for easy reference to show each diver name and associated depth and pressure data. Stats interface 518 may provide similar visualizations for any data, including, for example, tank gas pressure, time under water, location and distance from topside buoy 108, and any other data that may be collected and displayed. Any above-described diver data may be displayed as well as any environmental conditions such as, for example, water temperature, water depth, water currents, wind speed, air temperature, barometric pressure, and any other data that may be collected underwater or above water.

In some embodiments, dive interface 500 may also display alerts and notifications if any diver is outside of a normal range of operation. The normal range of operation may be defined for each set of variables by threshold values. For example, scuba tank 116 of diver 102 may include enough air for a one-hour dive. A threshold time limit may be set for forty-five minutes. When diver 102 is breathing from scuba tank 116 for 45 minutes a notification provided to diver 102 by wearable device 106 and by dive interface 500 by, for example, highlighting the diver's name and displaying a time left and a countdown until diver 102 is out of air. In another exemplary scenario, a depth threshold may be applied. A recreational dive may be restricted to forty meters. If diver 102 dives beyond 30 meters a yellow alert may appear, and communications may be provided to diver 102 to return to a safe depth. If diver 102 dives beyond forty meters a red alert may appear and diver 102 may be automatically notified to return to the surface. Thresholds may be applied to any dive statistic discussed herein.

In another exemplary embodiment, diver 102 may be a single diver and may use topside buoy 108 as depicted in FIG. 1. Diver 102 may use topside buoy 108 with an anchor and a tether. For example, the diver 102 may dive closely to shore by swimming out with topside buoy 108 to GPS coordinates provided by location determining element 412 on topside buoy 108. The GPS coordinates may be displayed on wearable device 106 and provide a distance to a stored location of the GPS coordinates and provide an indication when the diver 102 has arrived at the stored GPS coordinates. The location coordinates may be provided by GPS or Iridium receiver.

Diver 102 may drop an anchor for topside buoy 108 such that topside buoy 108 remains close to the GPS coordinates. As diver 102 descends, a water current may push diver 102 off course. The location of diver 102 relative to topside buoy 108 may be determined as described above, and, because the geographic location of topside buoy 108 is known along with the GPS coordinates of a target object, topside buoy 108 may transmit directions to diver 102 to locate the target object. Furthermore, topside buoy 108 may transmit an alert to diver 102 when diver 102 is in proximity to the target object. Similarly, topside buoy 108 may send an alert to diver 102 when diver 102 is in proximity to underwater obstacles as described above.

In some embodiments, the application and dive interface 500 may integrate with a chartplotter for boat navigation. The dive data may be sent from topside buoy 108 to the chartplotter, which may automatically be displayed on a map of the chartplotter. This allows topside monitoring station user 112 to not have extra screens to monitor diver 102 and, as such, all information needed to navigate boat 114 and monitor divers is provided on a single screen. Furthermore, boat 114 may be in an autopilot mode. In some embodiments, boat 114 may be controlled to follow diver 102 such that diver 102 is always within a threshold distance of boat 114. Diver depth information may be utilized by the boat 114 to ensure proper distance between the boat 114 and diver 102. As such, diver 102 may freely dive without worry of swimming too far from boat 114. In some embodiments, boat position may be transmitted to diver 102 such that diver 102 may view relative position of boat 114 on wearable device 106. Furthermore, if diver 102 dives beyond a maximum threshold from boat 114, boat 114 may be automatically navigated to diver 102 and an alert may be presented to topside monitoring station user 112 and diver 102.

The chartplotter, or other marine electronics, may be coupled with its own transducer for fishfinding, object detection, and other traditional purposes. In such configurations, the chartplotter may utilize its own transducer to communicate directly with the one or more divers and/or the buoy 108 instead of using radio frequency techniques. Additionally, upon receiving diver data from the diver(s) and/or buoy 108 via the chartplotter's transducer, the chartplotter may transmit the diver data, and/or information associated therewith, to users' smartphones, remote servers, and communication networks using a radio associated with the chartplotter. Thus, in some configurations, chartplotter may provide similar functionality to buoy 108.

FIG. 6 depicts dive analytics interface 600. In some embodiments, dive analytics interface 600 is presented after the dive; however, the dive analytics may be accessed at any point during the dive. In some embodiments, dive analytics interface 600 may depict map 602, depth analysis 604 comprising depth graph 606, water temperature analysis 608 comprising water temperature graph 610, heart rate analysis 612 comprising heart rate graph 614, gas consumption analysis 616 comprising gas consumption graph 618, and tank pressure analysis 620 comprising tank pressure graph 622. The dive parameters for analysis here are exemplary and any data that may be obtained during the dive may be analyzed such as, for example, blood oxygen, blood pressure, core temperature, water currents, location, wind speed on surface, air temperature, and any other data associated with the dive and environment during the dive.

In general, dive analytics interface 600 may provide a history of dive data such that topside monitoring station user 112 and diver 102 may review the dive. Diver 102 may review heart rate, gas consumption, and tank pressure, and may develop various dive methods to keep heart rate down and slow gas consumption to stay underwater longer. Furthermore, as described above, diver 102 may store locations of interest and review the stored locations post dive. The dive locations may be stored and presented as relative locations or geographic locations. The analytics presented via dive analytics interface 600 may provide valuable information about the dive such that diver 102 may modify and improve future dives.

Figure 7:
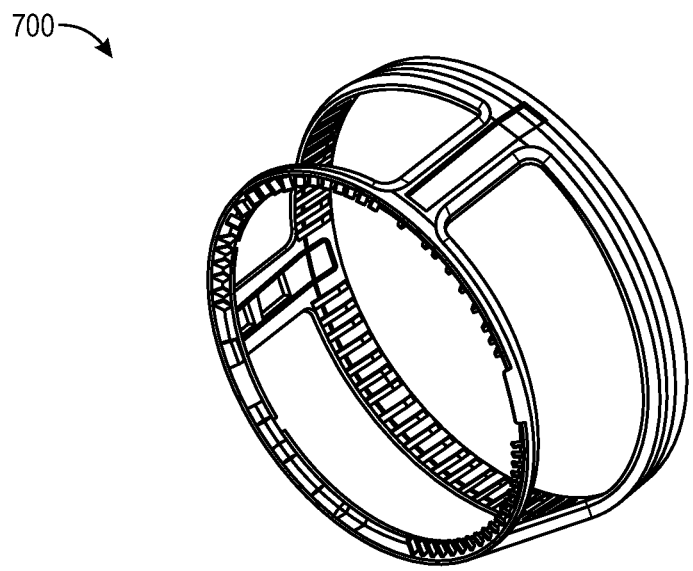
FIG. 7 depicts an exemplary transducer roll cage.

FIG. 7 depicts an exemplary transducer roll cage 700 for buoy transducer element 414 on topside buoy 108 or any other transducer on any of the above-described components. In some embodiments, transducer roll cage 700 may be configured to protect buoy transducer element 414 from sudden forces such as if topside buoy 108 is dropped, hit by boat 114, or investigated by marine life. Transducer roll cage 700 may surround buoy transducer element 414 and absorb energy from impact on housing 402 of topside buoy 108. Transducer roll cage 700 may be provided around each transducer element when a plurality of transducer elements are present such as, for example, when three transducers are arranged in the triangular formation as described in embodiments above. As such, all transducer elements of the plurality of transducer elements may be protected.

Figure 8:
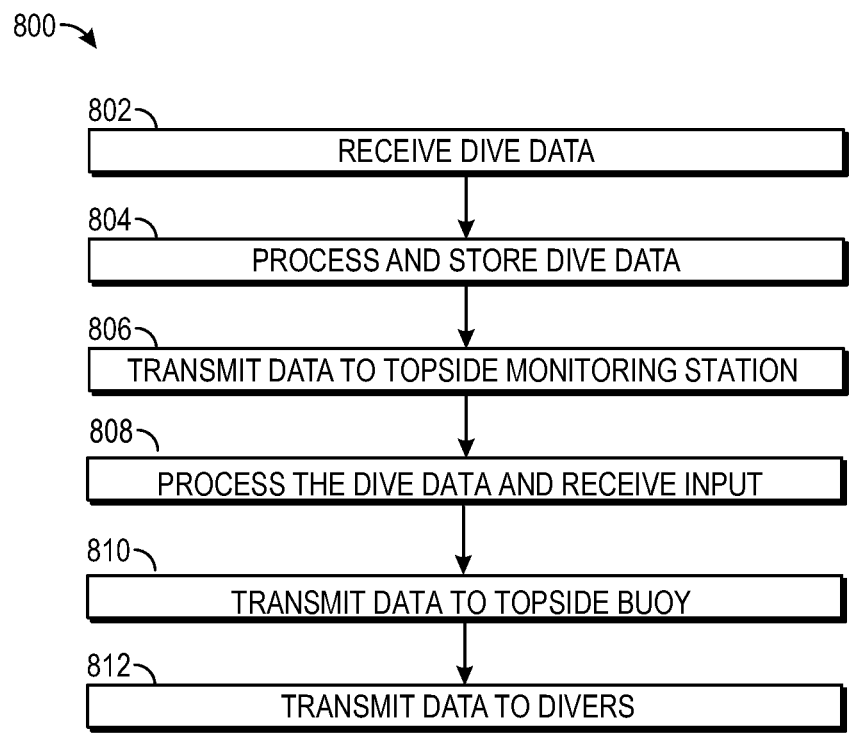
FIG. 8 depicts an exemplary method of monitoring the status of the diver by the topside system.

FIG. 8 depicts an exemplary method for monitoring the status of diver 102 by the topside system generally referenced by numeral 800. At step 802, dive data may be obtained by topside buoy 108 from wearable device 106 by the sonar signal. The dive data may include any of the above-described data associated with the dive such as, for example, water pressure and depth, time spent underwater, tank gas pressure and estimated time remaining, diver biometric data, and any other data that may be collected and transmitted to topside buoy 108. A time delay of the sonar signal may be determined as well as an angle from which the sonar signal originated.

At step 804, topside buoy 108 may process and store the obtained dive data. The dive data may be stored at topside buoy 108 for future processing and review for analytics visualization as described in relation to FIG. 5 and FIG. 6 above. Furthermore, the dive data may comprise any messages and location input from diver 102 to wearable device 106. The dive data may be processed for transmission to topside monitoring station 110.

At step 806, topside buoy 108 may transmit the dive data to topside monitoring station 110. The transmission may be performed by short- or long-range communication such as WiFi, BLUETOOTH, RF, 3G, LTE, 4G, 5G, and any other standard format. In some embodiments, topside monitoring station 110 may be on boat 114 or may be on shore, or any location that may be in proximity to topside buoy 108 or at a great distance. In some embodiments, topside buoy 108 may transmit the dive data by satellite.

At step 808, topside monitoring station 110 may process and display the dive data. As described above and displayed in FIG. 5 and FIG. 6, the dive data may be displayed as well as the processed analytics data. Topside monitoring station 110 may receive the dive data from topside buoy 108 and process the data to be visualized and/or transmitted and stored. Furthermore, at step 810, topside monitoring station 110 may receive instructions either automatically based on the determined location of diver 102 and the dive data or by topside monitoring station user 112. The input data may be in any form including message data that may be transmitted to wearable device 106 via topside buoy 108.

At step 810, topside buoy 108 may receive and process data from topside monitoring station 110. The data may be received by buoy transceiver 406. The data including the instructions may be processed and sent to buoy transducer element 414 and a sonar signal indicative of the data may be generated. The sonar signal may be transmitted to wearable device 106 and displayed for diver 102. In some embodiments, wearable device 106 may automatically generate a signal receipt message that may be transmitted to topside buoy 108 and relayed to topside monitoring station 110.

In some alternative embodiments, topside buoy 108 may in communication with an autonomous underwater vehicle (AUS). The AUS may use stored navigation waypoints or receive navigation information from topside buoy 108 in communication with topside monitoring station 110. The AUS may dive deeper than diver 102 and may explore locations that diver 102 may not be able to dive. As such, it may be advantageous for diver 102 to be replaced by the AUS. The AUS may be connected electronically to wearable device 106 or the components of wearable device 106 such that the communication between AUS and topside buoy 108 is as described in embodiments above. As such, AUS may operate similarly to diver 102 as described.

In some embodiments, monitoring equipment may be stationed below the water surface and may be in communication with topside buoy 108. For example, water current at various depths may be measure by sensors disposed on an anchor line, or the status of electric generators on the sea floor may be monitored and transmitted to topside buoy 108. As such, topside buoy 108 may store the data and transmit the data and any alerts to monitoring stations anywhere around the world.

In another exemplary embodiment, fishing equipment such as, for example, underwater nets, crab traps, lobster traps, and the like may be placed underwater for extended periods. The fishing equipment may be connected to topside buoy 108 and provide sensor data that may indicate that marine life has been caught. As such, a signal may be transmitted to a mobile device of the fisherman. The fisherman may be alerted when there is motion in the traps and retrieve the fishing equipment.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A topside buoy system for monitoring a status of a diver, the topside buoy system comprising:
   one or more transducers for receiving a first sonar signal from a wearable device or scuba tank pod of the diver, wherein the first sonar signal comprises dive data, wherein the dive data is indicative of a depth of the diver; and
   a transceiver configured to transmit to and receive from a water surface topside monitoring station;
   wherein the transceiver receives instructions from the topside monitoring station, and
   wherein the one or more transducers transmit a second sonar signal indicative of the instructions to the wearable device,
   wherein a relative location of the diver to the topside buoy system is determined by:
      receiving the first sonar signal at each transducer of the plurality of transducers at the different arrival times;
      determining a difference between the different arrival times;
      calculating an angle from which the first sonar signal originated based on the different arrival times;
      determining a time delay between an expected receipt time of the first sonar signal and an actual receipt time of the first sonar signal;
      determining the depth of the diver based on the dive data; and
      determining a three-dimensional position of the diver relative to the topside buoy system based on the angle, the time delay, and the depth.

2. The topside buoy system of claim 1, wherein the transceiver receives, from the topside monitoring station, location data indicative of a geographic location of the diver, and diver navigation information, to direct the diver to a new location.

3. The topside buoy system of claim 1, wherein the dive data received from the wearable device includes biometric data.

4. The topside buoy system of claim 1,
   wherein communication between the topside buoy system and the topside monitoring station is facilitated by a short-range communication, and
   wherein the topside buoy system further provides satellite communication.

5. The topside buoy system of claim 1,
   wherein the dive data is received by a plurality of sonar signals from a plurality of wearable devices associated with a plurality of divers, and
   wherein the dive data is transmitted to the topside monitoring station, and
   wherein the dive data is displayed at the topside monitoring station.

6. The topside buoy system of claim 1, wherein the transceiver receives instructions from the topside monitoring station, wherein the one or more transducers transmit a second sonar signal indicative of the instructions to the wearable device, wherein the transceiver receives, from the topside monitoring station, location data indicative of a geographic location of the diver, and diver navigation information, to direct the diver to a new location, and wherein the geographic location of the diver is compared to underwater terrain data and underwater obstacles data.

7. The topside buoy system of claim 6, wherein the diver navigation information is received from the topside monitoring station as a text message, and the text message is transmitted from the topside buoy system to the wearable device by the one or more transducers.

8. The topside buoy system of claim 6, wherein the diver navigation information directs the diver to avoid underwater obstacles or directs the diver to return to the water surface or a boat associated with the topside monitoring station.

9. A topside buoy system for monitoring a status of a diver, the topside buoy system comprising:
   one or more transducers for receiving a first sonar signal from a wearable device of the diver,
   wherein the first sonar signal comprises dive data,
   wherein the dive data is indicative of a depth of the diver and an amount of breathable gas in a scuba tank of the diver;
   wherein the one or more transducers are configured to detect a relative location of the diver; and
   a transceiver configured to transmit to and receive from a topside monitoring station;
   wherein the transceiver receives instructions from the topside monitoring station,
   wherein the instructions are based at least in part on the relative location of the diver, and
   wherein the one or more transducers transmit a second sonar signal indicative of the instructions to the wearable device,
   wherein the one or more transducers include three transducers configured in a triangle for receiving the first sonar signal at different arrival times, and
   wherein the relative location of the diver is determined based on an angle of the first sonar signal determined by the different arrival times of the first sonar signal at the three transducers, the depth of the diver, and a time of arrival of the first sonar signal compared to an expected time of arrival of the first sonar signal.

10. The topside buoy system of claim 9, further comprising one or more non-transitory computer-readable media storing computer-executable instructions that, when executed by a processor, perform steps comprising: receiving, from the topside monitoring station, data indicative of a geographic location of the diver relative to underwater objects, wherein the geographic location is based at least in part on the relative location of the diver; receiving the instructions from the topside monitoring station by text message, and transmitting the text message to the wearable device.

11. The topside buoy system of claim 10, wherein the computer-executable instructions are further executed to perform the step of transmitting, by the one or more transducers, the second sonar signal to the wearable device for display of the text message from the topside monitoring station.

12. The topside buoy system of claim 10, wherein the topside monitoring station is a mobile device.

* * * * *